United States Patent

[11] 3,523,504

| [72] | Inventor | Roland P. Jones |
| | | Wayne, Michigan |
| [21] | Appl. No. | 686,952 |
| [22] | Filed | Nov. 30, 1967 |
| [45] | Patented | Aug. 11, 1970 |
| [73] | Assignee | Jervis B. Webb Company |
| | | a Corp. of Michigan |

[54] POWER AND FREE CONVEYOR
10 Claims, 7 Drawing Figs.

[52] U.S. Cl. .................................................. 104/172, 104/178
[51] Int. Cl. ..............................................B65g 17/12, B65g 17/42
[50] Field of Search .................................. 104/172, 178, 89

[56] References Cited
UNITED STATES PATENTS

| 3,420,188 | 1/1969 | Dehne et al. | 104/172 |
| 2,947,264 | 8/60 | Parker | 104/172 |
| 2,987,012 | 6/61 | King | 104/172 |
| 3,060,866 | 10/62 | Schreyer | 104/172 |
| 3,081,712 | 3/63 | Schreyer | 104/172 |

*Primary Examiner*— Arthur L. LaPoint
*Assistant Examiner*— Robert Saifer
*Attorneys*— Farley, Forster and Farley ABSTRACT: A conveyor for propelling carriers along a track by pusher units on a driven chain supported above the carrier track, with means for stopping, accumulating and transferring carriers. Each carrier has fixed at its front and rear ends, respectively, a driving dog and a combination releasing and transfer dog. Each pusher unit includes longitudinally spaced hold back and pusher dogs pivotal in unison on a longitudinal axis from a normal operative position by cam means on the hold back dog engaging a stop or the releasing dog of a preceding stopped carrier, the stop and releasing dog each being longer than the spacing between the pusher unit dogs.

Patented Aug. 11, 1970
3,523,504
Sheet 1 of 2
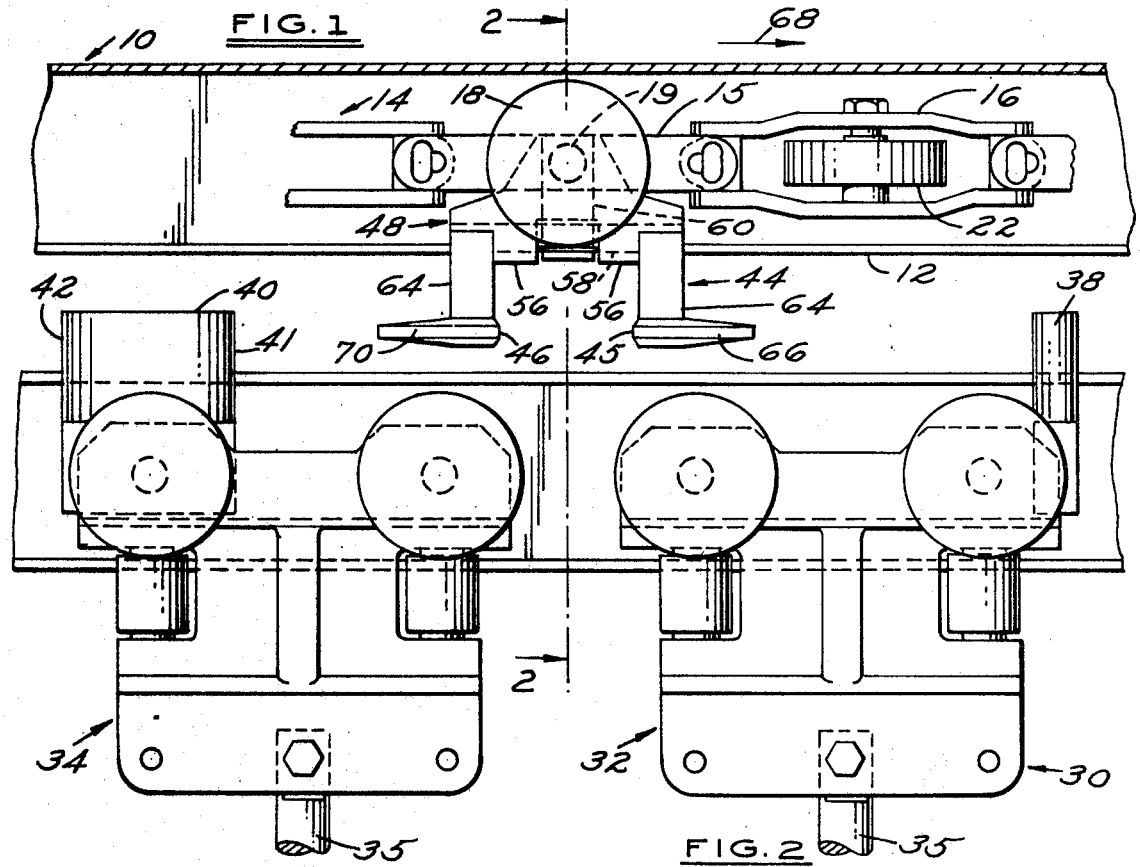
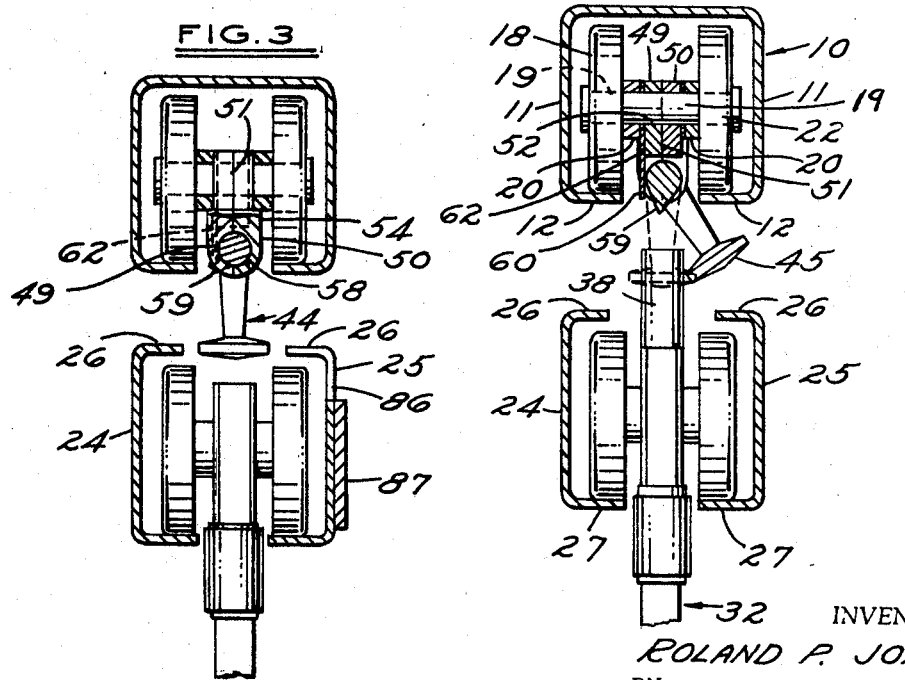
INVENTOR.
ROLAND P. JONES
BY
Farley, Forster & Farley
ATTORNEYS

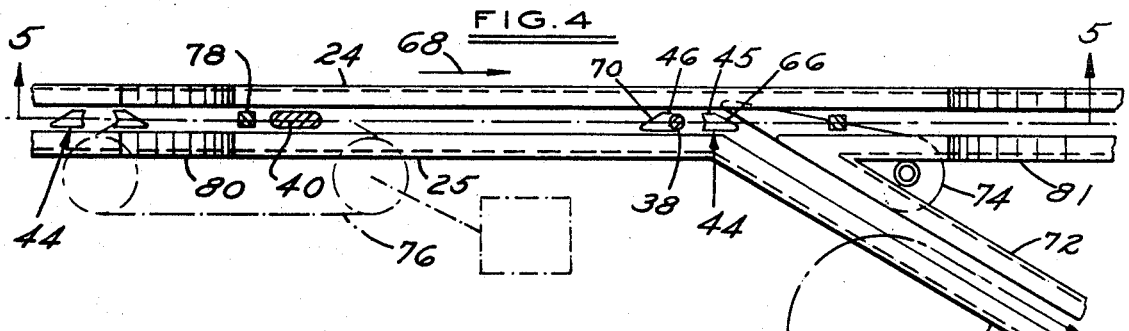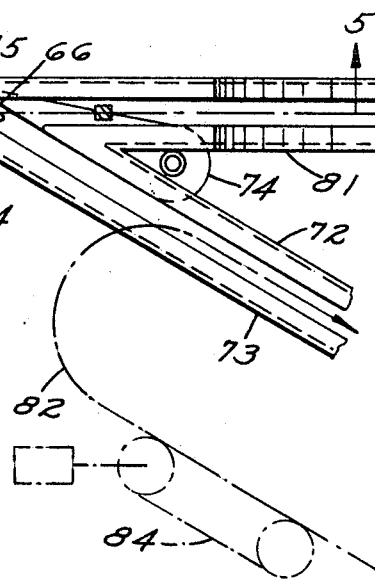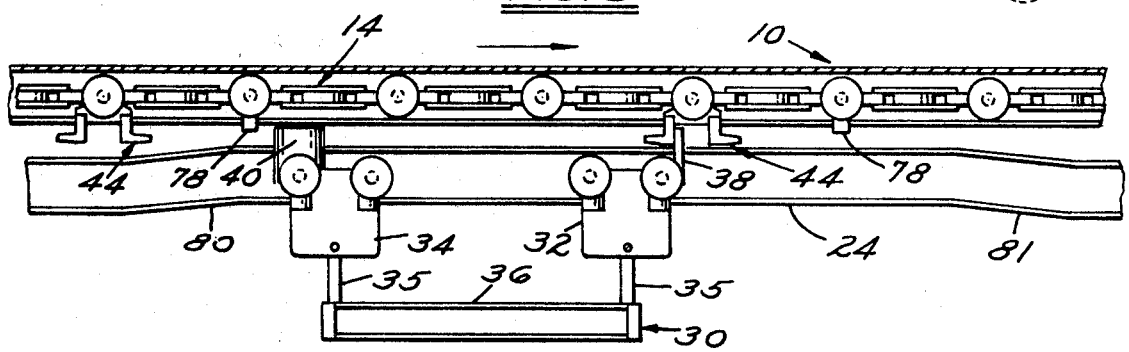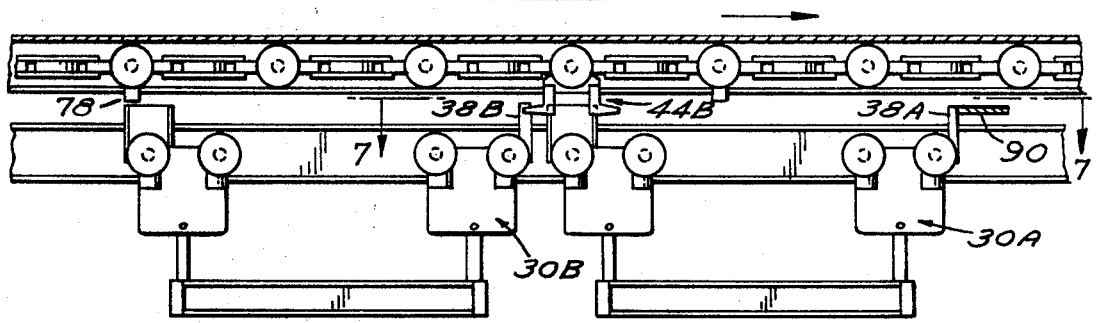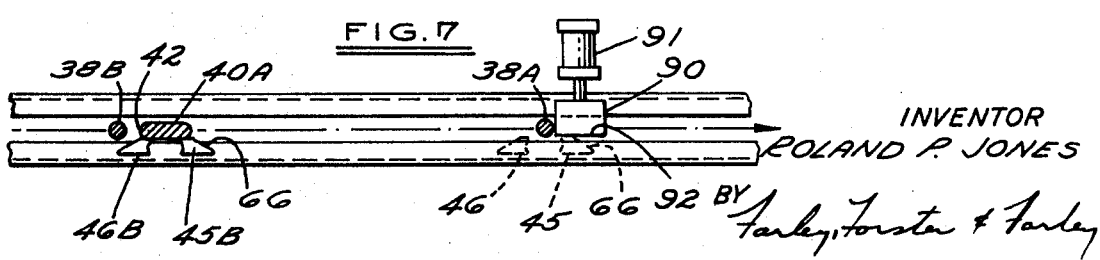

3,523,504

POWER AND FREE CONVEYOR

BACKGROUND OF THE INVENTION

Field of the invention

This invention relates to improvements in conveyors of the power and free type in which carriers are propelled along a supporting track by pushers of a driven chain supported on an adjacent track engaging driving dogs on the carriers, enabling carriers to be stopped, to accumulate behind a stopped carrier, and to be transferred between main and branch carrier supporting tracks.

Description of the prior art

In most prior conveyors of the type under discussion, the driving dog on the carrier is movable between a driving and a non-driving position relative to a pusher by action of a trackside carrier stopping device or by driving dog releasing mechanism encountering a preceding stopped carrier. Examples of this form of construction may be found in U. S. Patents 3,044,416, 3,247,806 and others. A few constructions have been proposed in which the pushers on the chain are movable between driving and non-driving positions relative to a fixed driving dog on the carriers, as exemplified by U. S. Patent 3,099,228 and British Patent 910,682; and the present invention relates to this form of power and free conveyor.

Since there are normally many more pushers on the propelling chain than there are carriers in a power and free system, a construction for movable or releasable pushers must be extremely simple in order to be practical economically. Also, releasing movement of a pusher must be positive and jam free, with preferably no component of pusher movement extending in the direction of carrier travel. The present invention overcomes such problems and provides other advantages not found in prior constructions.

A SUMMARY OF THE INVENTION

The invention provides an improved construction in which a plurality of pusher units are provided on a propelling chain for moving carriers along a supporting track. Each pusher unit includes a pusher dog, a hold back dog, and means mounting the pusher and hold back dogs in spaced relation longitudinally of the propelling member for pivotal movement in unison on an axis extending longitudinally of the propelling member. The hold back dog of each unit has a forwardly extending cam portion adapted to cause pivotal movement of the dogs in one direction from a normal position of relative alignment with a carrier driving dog in response to engagement of the cam portion with an object in the path of travel. The pusher and hold back dogs are preferably gravity biased for return movement to this normal position, and each pusher unit includes means resiliently opposing pivotal movement of the pusher and hold back dogs from the normal position in the other direction.

Each carrier is provided with a fixed driving dog at the forward end thereof and a fixed releasing dog at the rear end thereof, the releasing dog having a length in the direction of carrier travel greater than the longitudinal spacing between the pusher and hold back dogs of a pusher unit. A trackside stopping device includes a member movable into the path of travel of a carrier driving dog for abutting engagement thereby, this member also having a length in the direction of carrier travel which is greater than the longitudinal spacing between the pusher and hold back dogs of a pusher unit. Hence, when the forwardly extending cam portion on the hold back dog of a pusher unit engages the stopping device member or engages the releasing dog of a carrier, the pusher and hold back dogs are pivoted to and retained in a released position until the stopping device member or carrier releasing dog is by-passed, thus disengaging the pusher dog of the pusher unit from a carrier driving dog.

The preferred means for mounting of the pusher and hold back dogs of each pusher unit simply includes a bracket secured to an axle of a pair of propelling member supporting wheels and having a depending portion in which a shaft is pivoted. Each of the dogs has an arm fixed to the shaft and a cam on the shaft is engageable with a resilient member supported by the bracket to resiliently oppose free swinging movement of the dogs in one direction from their normal operative position.

Another preferred feature of the invention consists of a rigid, short supplementary pusher mounted on the propelling member and spaced behind each of the pusher units a distance slightly greater than the length of the carrier, each supplementary pusher being non-engageable with the driving and releasing dogs of a carrier at a normal track spacing. When the track spacing is reduced, as in advance of a switch for diverting a carrier onto a branch track, the supplementary pusher is brought into driving relation with the releasing dog of a carrier so that the releasing dog then functions as a supplementary carrier driving dog.

Positive, non-releasable engagement between the dogs of a pusher unit and the driving dog of a carrier can be obtained by reducing the spacing between the carrier and the propelling member supporting tracks to place the pusher unit dogs between upper flanges provided on the carrier supporting track, which flanges then act to positively limit pivotal movement of the pusher unit dogs to a disengaged position relative to the carrier driving dog.

Other features and advantages of the invention will appear from the description to follow of the presently preferred embodiment illustrated in the accompanying drawing.

BRIEF DESCRIPTION OF THE DRAWING

The drawing comprises the following views:

FIG. 1 is an enlarged side elevation showing a pusher unit and the principal components of a carrier;

FIG. 2 is a sectional view taken as indicated by the line 2-2 of FIG. 1;

FIG. 3 is a sectional view similar to FIG. 2 but showing the relationship at a reduced spacing between the carrier and propelling member supporting tracks;

FIG. 4 is a schematic plan view of a portion of a conveyor system showing a junction between a main and a branch line;

FIG. 5 is a side elevation taken as indicated by the line 5-5 of FIG. 4;

FIG. 6 is a side elevation showing a pair of carriers accumulated at a wayside stopping device; and, FIG. 7 is a schematic plan view taken as indicated by the line 7-7 of FIG. 6.

DESCRIPTION OF THE PREFERRED EMBODIMENT

Referring to FIGS. 1 and 2, an upper track member 10 of enclosed section, having a pair of side walls 11 and a transversely spaced pair of lower flanges 12, supports and guides an endless propelling chain 14 having alternate vertically oriented links 15 and horizontally oriented links 16. A pair of supporting wheels 18 is mounted on an axle 19 extending between vertical, transversely spaced side walls 20 of each of the links 15, the wheels normally rolling on the lower track flanges 12. A guide wheel 22 is rotatably mounted between the sides of each of the links 16, and may engage either of the track side walls 11.

A carrier supporting track, consisting of a pair of transversely spaced C-shaped rails 24 and 25, each having an upper flange 26 and a lower flange 27 is mounted below the chain supporting track 10 in vertical alignment therewith by suitable track hangers (not shown).

Carriers 30 are supported on the rails of the lower track. Each carrier includes a front trolley 32 and a rear trolley 34 having pivotally mounted depending members 35 connected to a load bar 36 (FIG. 5). An upwardly projecting cylindrical driving dog 38 is fixed to the leading end of the front trolley 32; and, an elongated upwardly projecting releasing dog 40, having rounded front and rear ends 41 and 42 is fixed to the rear trolley 34 at the trailing end thereof.

Pusher means secured to the chain propels a carrier by engagement with the driving dog 38 thereof, and in the present construction the pusher means comprises pusher units 44, each unit including a forward hold back dog 45 and a rearward pusher dog 46 spaced longitudinally from the hold back dog 45, together with suitable means mounting the pusher and hold back dogs for pivotal movement in unison on an axis extending longitudinally of the propelling member or chain. The dog mounting means illustrated consists of a bracket 48 formed in two halves 49 and 50 (FIG. 3) which abut on a longitudinal center line 51. The bracket halves 49 and 50 each include an upper portion projecting between the side walls 20 of a chain link 15 and provided with an aperture 52 through which the wheel axle 19 extends, a side flange 54 overlapping one of the link side walls 20, and a downwardly extending portion including a pair of longitudinally spaced half bushings 56. A shaft 58 is pivotally carried in the bushings 56, and a cam 59, formed on the shaft between the bushings 56 is adapted to act against a leaf spring 60 which is mounted on the axle 19 and retained within a central recess 62 in the outer face of the bracket. Each of the hold back and pusher dogs 45 and 46 is secured to the shaft 58 by an arm 64 fixed to the shaft and depending therefrom.

The hold back dog 45 has a forwardly extending cam portion 66 adapted to cause pivotal movement of the hold back and pusher dogs in unison in one direction from a normal position of relative alignment with a carrier driving dog in response to engagement with an object in the path of travel such as the carrier driving dog 38 or releasing dog 40. Such pivotal movement is illustrated by the full line position of the hold back dog 45 in FIG. 2 and is counter-clockwise as the parts appear in this view, moving the cam 59 away from the leaf spring 60. The pusher and hold back dogs are biased by their own weight to return to normal position, indicated in broken line, with pivotal movement of the dogs in the other direction from their normal position being resiliently opposed by the action of the cam 59 against the leaf spring 60.

Thus, with the construction shown in FIG. 1 if the chain and pusher units are moving in the direction of the arrow 68, and the carrier 30 is stopped, the cam portion 66 on the hold back dog 45 will engage the carrier driving dog 38 causing the hold back and pusher dogs to pivot around the carrier driving dog 38 and return to normal position, the pusher dog 46 then engaging the carrier dog 38. The carrier releasing dog 40, as shown in FIG. 1, has a length in the direction of carrier travel greater then the longitudinal spacing between the hold back and pusher dogs 45 and 46 of a pusher unit; hence if the releasing dog 40 of a stopped carrier is engaged by a moving pusher unit, both the hold back and pusher dogs are pivoted to a released or non-driving position and retained therein until both dogs pass around the carrier releasing dog 40. Each pusher dog 46 includes a rearwardly extending cam portion 70 having the same action as the cam portion 66 on the hold back dog 45, so that if a pusher unit is overtaken by a moving carrier, the pusher and hold back dogs will be pivoted in the same direction and in the same manner as illustrated in FIG. 2.

Portions of a conveyor system are shown in FIGS. 4-7 to illustrate the application of the invention, as well as other features thereof. FIGS. 4 and 5 schematically depict a transfer zone at a junction between the carrier supporting track rails 24 and 25 of a main line and the track rails 72 and 73 of a branch line, a diverter or switch 74 being installed at the junction. The main propelling chain 14, suitably driven by the schematically illustrated drive unit 76, travels on the track 10 above the main carrier supporting track rails 24 and 25, and is equipped with the pusher units 44. The chain 14 is also equipped with short, rigid supplementary pushers 78 each of which trails one of the pusher units 44 a distance greater than the length of a carrier 30.

At a normal spacing between the propelling member and carrier supporting tracks, such as best illustrated in FIG. 6, the supplementary pushers 78 are in clearance or non-engaging relation with the driving and releasing dogs 38 and 40 of a carrier. However, at the transfer zone of FIGS. 4 and 5, the spacing between the carrier and propelling member supporting tracks is decreased along the section 80 of the carrier track rails in advance of the junction, and returned to a normal spacing along the track rail section 81 following the junction. Between the track sections 80 and 81 the supplementary pushers 78 are capable of engaging the releasing dog 40 of the carrier; hence, when a carrier is diverted onto the branch track rails 72 and 73 by the deflector 74, the supplementary pusher 78 trailing the pusher unit 44 which had been in engagement with the driving dog 38 of the diverted carrier, will engage the releasing dog of the diverted carrier and advance it onto the branch line and into a position in which the carrier driving dog may then be engaged by suitable pusher units (not shown) of a branch line propelling chain 82 independently driven by a drive unit 84. Whether or not the branch line is powered will of course depend upon the requirements of a particular system. Along the section of reduced spacing between the tracks, the carrier supporting track rail 25 may be cut away, as indicated by the reference 86 in FIG. 3, and equipped with a reinforcing member 87, permitting free disengaging movement of the dogs 45 and 46 of the pusher units 44 as insurance against a jammed condition.

The accumulation of carriers is illustrated in FIGS. 6 and 7. A track side stopping device, consisting of a stop member or plate 90 is movable into and out of the path of travel of a carrier driving dog 38 and dogs of the pusher units 44 by suitable actuating means 91. In the blocking position illustrated, the stop member 90 is engaged by the cam portion 66 on the hold back dog 45, causing the hold back and pusher dogs 45 and 46 to pivot to the released position indicated in broken line in FIG. 7, The carrier driving dog 38 then abuts against the stop member 90, and a surface 92 thereof, extending in the direction of travel a distance greater than the spacing between the hold back and pusher dogs 45 and 46, retains the dogs in released position until they pass the stop member.

In FIGS. 6 and 7, a leading carrier 30A has been stopped as just described and a pusher unit 44B propelling a following carrier 30B has been disengaged from the driving dog 38B thereof by action of the releasing dog 40A of the leading carrier. The rear end 42 of the releasing dog 40A, when engaged by the cam portion 66 on the hold back dog 45B, moves the hold back and pusher dogs 45B and 46B to released position. The length of the releasing dog 40A is also greater than the longitudinal spacing between the hold back and pusher dogs 45B and 46B so that these dogs are retained in released position until the releasing dog 40A has been passed.

When the stop member 90 is moved to non-blocking position, the driving dog 38A of carrier 30A will be picked up and engaged by the next approaching pusher unit 44, and when the carrier 30A has moved on, the carrier 30B may be picked up by the next following pusher unit.

If vertical curve sections are required in a conveyor system, it may be advisable to employ a reduced spacing between the carrier and propelling member supporting tracks along these sections such as illustrated in FIG. 3. Neither of the carrier supported track rails 24 or 25 is cut away along the vertical curved section so that the upper flanges 26 of the track rails 24 and 25 serve to positively limit pivotal movement of the dogs of the pusher units 44 in either direction, thereby positively retaining the pusher unit dogs in engaged relation with a carrier driving dog 38 under the increased reaction forces which may be encountered as a carrier traverses the vertical curve section.

Among the more important features of the invention are the following:
1) The simple, relatively inexpensive pusher construction may be employed with a conventional type of conveyor chain, being secured to the conveyor chain by the axle which carries the chain supporting wheels.
2) Movement of the pusher dog to a released position relative to the dog of a carrier is transverse to the direction of carrier movement and uni-directional under normal operating conditions. Return pivotal movement of the pushers to a normal operative position is gravity biased and dampened to prevent over-travel and pivotal oscillation of the pushers. However, pivotal movement of the pushers in the other direction is possible to relieve a jamming condition, such as could occur for example, when a carrier is being transferred from one propelling chain to another.

3) The carrier construction is relatively simple and inexpensive in the sense that the pusher and releasing dogs 38 and 40 are fixed members.

4) The releasing dog 40 may be optionally employed as a supplementary carrier driving dog.

5) The carrier track rails may be employed to positively establish the operative position of the dogs of a pusher unit relative to the driving dog of a carrier.

Those skilled in the art will readily appreciate that various modifications to the construction disclosed and described herein may be necessary or desirable in adapting the invention to the requirements of various conveyor systems. For example, carriers may be supported by a single trolley as well as multiple trolleys, other forms of chain may be used, as well as other types of carrier and propelling member supporting track.

I claim:

1. In a conveyor of the type in which a carrier is movable along a supporting track by pusher means on a propelling member supported by an adjacent track engaging a driving dog on the carrier, the improvement wherein the pusher means comprises pusher dog units each including a pusher dog, a hold back dog, and pivot means carried by the propelling member on which the pusher and hold back dogs are mounted in interconnected spaced relation longitudinally of the propelling member for pivotal movement in unison on a common axis extending longitudinally of the propelling member; the hold back dog of each unit having a forwardly extending cam portion adapted to cause pivotal movement of the dogs in one direction from a normal position of relative alignment with the carrier driving dog in response to engagement with an object in the path of travel.

2. A conveyor according to Claim 1 wherein each of said pusher units includes means resiliently opposing pivotal movement of the pusher and hold back dog from said normal position in the other direction.

3. A conveyor according to Claim 1 wherein said pivot means of each of said units includes a shaft, bracket means secured to the propelling member for pivotally supporting the shaft, each dog including an arm fixed to the shaft, and a cam on the shaft engageable with a resilient member supported by the bracket means in response to movement of the pusher and hold back dogs from said normal position in the other direction.

4. A conveyor system according to Claim 1 wherein each carrier is provided with a fixed driving dog at the forward end thereof and a releasing dog at the rear end thereof, the releasing dog having a length in the direction of carrier travel greater than the longitudinal spacing between the pusher and hold back dogs of a pusher unit.

5. A conveyor according to Claim 4 wherein the propelling member is provided with a plurality of supplementary pushers each of which is rigidly carried by the propelling member and spaced behind one of said pusher units a distance slightly greater than the longitudinal spacing between said driving and releasing dogs on a carrier, each supplementary pusher projecting toward the carrier supporting track a distance less than the pusher and hold back dogs and being non-engageable with the driving and releasing dogs of a carrier at a normal track spacing, and sections along which the spacing between the carrier and propelling member supporting tracks is reduced to place a supplementary pusher dog in driving relation with the releasing dog of a carrier.

6. A conveyor according to Claim 1 wherein the carrier supporting track comprises a pair of transversely spaced rails each having lower and upper flanges which respectively support and overlie the wheels of a carrier, the spacing between the upper flanges of said rails being greater than the width of said driving and hold back dogs transversely of said rails, the propelling member supporting track being mounted above the carrier supporting track in vertically centered alignment therewith at a normal spacing such as to permit said pivotal movement of the pusher and holdback dogs, and a section along which the spacing between the carrier and propelling member supporting tracks is decreased to an extent sufficient to place the pusher and hold back dogs intermediate said upper flanges of the rails of the carrier supporting track to limit pivotal movement of the pusher hold back dogs in either direction.

7. A conveyor according to Claim 6 wherein one of the rails of the carrier supporting track in a section of decreased spacing between the carrier and propelling member supporting tracks is cut away to permit said pivotal movement of the pusher and hold back dogs in said one direction.

8. A conveyor according to Claim 1 where said object in the path of travel comprises a carrier stopping member, means for moving the stopping member into an operative position in which it extends across the path of travel of said pusher and hold back dogs for abutting engagement by a carrier driving dog, said stopping member having a length in the direction of carrier travel greater than the longitudinal spacing between the pusher and hold back dogs of one of said units.

9. A conveyor according to Claim 8 wherein each carrier is provided with a fixed driving dog at the forward end thereof and a releasing dog at the rear end thereof, the releasing dog having a length in the direction of carrier travel greater than the longitudinal spacing between the pusher and hold back dogs of one of said units.

10. A conveyor according to Claim 1 wherein the propelling member is a chain of alternate vertically and horizontally mounted links, the vertical chain links each having a pair of transversely spaced side walls defining a vertically extending slot, an axle carried by said side walls and extending transversely across said slot and a pair of wheels mounted on the axle, the pivot means comprising a bracket having a portion positioned between the side walls of a vertically mounted chain link and provided with an aperture through which the axle extends, the bracket having a transversely projecting flange overlapping a portion of the chain link, the bracket further including a portion projecting outwardly of the chain link slot and a shaft to which the pusher and hold back dogs are each secured being pivotally carried by the outwardly projecting bracket portion.